United States Patent
Inoue et al.

[11] 3,849,001
[45] Nov. 19, 1974

[54] POLARIZATION INTERFERENCE CORRELATION SPECTROMETER

[75] Inventors: Masaru Inoue; Toshio Kaneko; Koichi Matsumoto; Makoto Ishikawa; Nobuo Akitomo, all of Katsuta, Japan

[73] Assignee: Hitachi Ltd., Tokyo, Japan

[22] Filed: June 16, 1972

[21] Appl. No.: 263,454

[30] Foreign Application Priority Data
June 18, 1971 Japan.............................. 46-43307

[52] U.S. Cl. ................ 356/98, 356/106 S, 356/114
[51] Int. Cl. .............................................. G01j 3/00
[58] Field of Search ........ 356/106 R, 106 S, 74, 98, 356/114–119; 350/12

[56] References Cited
UNITED STATES PATENTS
3,561,876  2/1971  Hoffman............................ 356/106

FOREIGN PATENTS OR APPLICATIONS
1,093,645  12/1967  Great Britain...................... 356/116

Primary Examiner—Ronald L. Wibert
Assistant Examiner—F. L. Evans
Attorney, Agent, or Firm—Craig & Antonelli

[57] ABSTRACT

A polarization interference correlation spectrometer comprising a first polarizer for polarizing a sample beam, a Soleil compensator for producing an appropriate optical path difference between the paths of the two orthogonal polarization components of the sample beam polarized by said first polarizer, a second polarizer for synthesizing the two orthogonal polarization components accompanied with said optical path difference and generating interference, and a photoelectric transducer for deriving said interference as a modulated electric signal.

15 Claims, 7 Drawing Figures

POLARIZATION INTERFERENCE CORRELATION SPECTROMETER

BACKGROUND OF THE INVENTION

1. Field of the Invention

This invention relates to a correlation spectrometer and more particularly to a polarization interference type correlation spectrometer.

2. Description of the Prior Art

Briefly, correlation spectroscopy employs the simultaneous detection of spectral peaks of a sample at a plurality of wavelengths, which is useful when a sample to be measured and its spectral characteristics are preliminarily known and especially when a dilute sample is to be quantitatively analyzed.

Conventionally, there are two types in spectrometers employing correlation spectroscopy; dispersion type correlation spectrometer and interferometer type correlation spectrometer. In the former, a mask is used in place of an exit slit of a dispersion type spectrometer for deriving a desired number of spectral peaks from the spectrum of the sample to be measured, and a light flux itself is minutely vibrated in the direction of dispersion by minutely vibrating the mask or monochromator. In the latter, the optical path difference is varied with a center at a spectral peak which appears at certain path difference as is seen in Michelson type interferometer. Dispersion type correlation spectrometers have such drawbacks that minute vibration of mask or light flux itself is not always easy and that the results of measurement become inaccurate when the peaks in the spectrum are very closely located.

On th other hand, interferometer type correlation spectrometers have such drawbacks that the amplitude of vibration should be varied according to the half value width of a signal peak, and especially for a sample not having good periodicity in the spectrum the half value width of a signal peak becomes large and the amplitude required for fully modulating the signal becomes also large. Further, when the number of substances to be measured in one sample is more than one and the regularities of spectral peaks of these substances are similar and are close to each other, the measurement becomes inaccurate.

SUMMARY OF THE INVENTION

An object of this invention is to provide a polarization interference correlation spectrometer of intensity modulation type in which modulation operation is very easily done.

Another object of this invention is to provide a polarization interference correlation spectrometer having extremely small light loss and thus being capable of performing high sensitivity measurement.

Further object of this invention is to provide a polarization interference correlation spectrometer which is perfectly free from mechanical vibrations and noise.

According to an embodiment of the invention, there is provided a polarization interference correlation spectrometer comprising a first means for polarizing a light beam, a second means for generating a difference in the optical paths for two polarization components of the light beam polarized by said first means, a third means for causing interference between said two polarization components which are subjected to said optical path difference, and a fourth means for deriving the intrference obtained by said third means as a modulated electric signal.

According to another embodiment of the invention, there is provided a polarization interference correlation spectrometer comprising a first means for polarizing a light beam, a second means for generating a difference in the optical paths for the two polarization components of the beam polarized by said first means, a third means for causing interference between said two polarization components subjected to said optical path difference by said second means, a fourth means for rotating said first or said third means and thereby modulating the interference derived from the third means, and a fifth means for deriving the interference beam modulated by said fourth means as an electric signal.

According to further embodiment of the invention, there is provided a polarization interference correlation spectrometer comprising a first means for polarizing a light beam, a second means for generating a difference between the optical paths for two polarization components of the light beam polarized by said first means, a third means for directing two interference beams of opposite polarity based on said two components subjected to the optical path difference by said second means along respective and separate optical paths, a fourth means for deriving said two interference beams as a modulated electric signal.

These embodiments achieve the aforementioned objects completely and further provide the following effects:

1. An intensity modulation system is employed and thus there is no need for minutely vibrating a mask or a monochromator to disperse the light flux itself, or minutely vibrating the optical path difference with a center at a signal peak which appears at a certain optical path difference, as is the case with the conventional cases. Therefore, a modulation signal at least two times as large as the conventional one can be obtained by a simple modulation operation. Further, even when the incident spectral peaks are closely adjoined to each other, they can be completely and separately measured unless they are completely superposed. Further, since the spectral peaks over all the wave numbers are used, there is no light loss and high sensitivity can be obtained;

2. Modulation can be done by simply rotating a first or a second polarizer. Thus the modulating operation becomes very simple;

3. Modulation can be done through perfectly electrical means, and thus the problem of mechanical vibrations and noise can be easily obviated.

Further objects, features and advantages of the invention will become apparent in the following description made in connection with the accompanying drawings.

DESCRIPTION OF THE PREFERRED EMBODIMENTS

Figure 1:
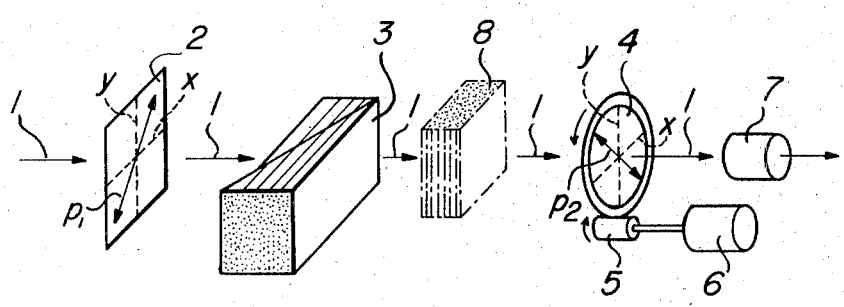
FIG. 1 is a perspective view of an embodiment of the present invention.

In FIG. 1, imaginary principal axis is indicated by numeral 1, and a first polarizer 2, a Soleil compensator 3 and another polarizer (analyser) 4 are aligned on and perpendicular to the principal axis 1. The polarizer 2 has a polarization direction P1 at an angle of 45° with respect to $x$ (horizontal) and $y$ (vertical) axes. The Soleil compensator comprises two wedges formed of a crystal which shows double refraction, the two wedges being slidable to change the total thickness. The optical axes of the wedges of the Soleil compensator are parallel to $x$ (or $y$) axis and perpendicular to the principal axis 1. The second polarizer 4 is disposed in a plane perpendicular to the principal axis after said Soleil compensator and has a polarization direction P2. The polarizer 4 has a circular shape and the outer periphery thereof is engaged with a rotor 5 which is driven by a motor 6. A detector 7 receives the exit light from the analyser 4.

The function of the above embodiment shown in FIG. 1 is as follows.

The light beam having been transmitted through a sample to be measured strikes the first polarizer 2 and thereby is linearly polarized in the direction P1 at 45° angled from X and y directions by the first polarizer 2. This linearly polarized light is then incident on the Soleil compensator 3. Considering the polarized beam incident on the Soleil compensator as a vector having a unit magnitude, it may be decomposed into two orthogonal components both having a equal magnitude of $1/\sqrt{2}$, namely a component parallel to the optical axis of the Soleil compensator 3 (which will be referred to as the $x$ polarization component) and another component perpendicular to said optical axis (which will be referred to as the $y$ polarization component). The crystal constituting the Soleil compensator 3 exhibits double refraction, i.e., has different refractive indices for $x$ polarization component and $y$ polarization component, and thereby gives a difference in the optical path of the two polarization components which transmit through the crystal. Such transmitted $x$ and $y$ components are then directed to the second polarizer (analyser) 4 which is rotated by the rotor 5 coupled with the motor 6. The second polarizer 4 forms a vector sum of the projections of $x$ and $y$ polarization components on the polarizing direction P2 and causes interference. Thus, polarization interference is derived from the second polarizer 4 and detected by the detector 7.

Figure 2:
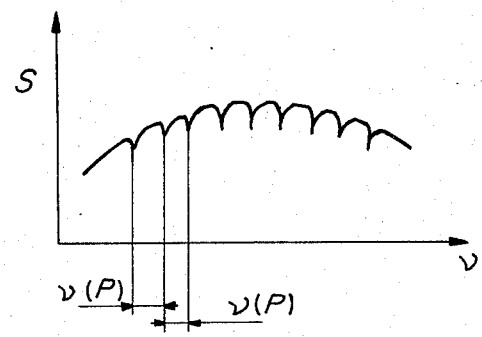
FIG. 2 is an example of a periodic absorption spectrum of a sample used in embodiments of the invention.
Figure 3A:
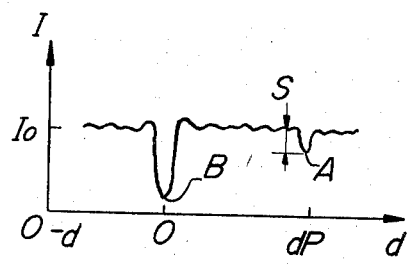
FIGS. 3a and 3b are interference spectra of opposite polarity obtained by the embodiment of the invention shown in FIG. 1.

For describing the above function more particularly, it is assumed here that a light passed through a sample having regular or periodic absorption spectral peaks with a wave number interval of $\nu(p)$ as shown in FIG. 2 is projected on the first polarizer 2 and the polarization direction P2 of the second polarizer 4 is set to orthogonally cross the polarization direction P1 of the first polarizer 2. When the two wedges of the Soleil compensator 3 are slid on the slant surface to continuously vary the total thickness in the direction of the principal axis 1 so that there is produced a difference between the optical paths for $x$ and $y$ polarization components by the Soleil compensator and is varied from a negative value to a positive value, an interference pattern as shown in FIG. 3a is detected from the polarization interference by the detector 7. Namely, at an optical path difference of $dP = 1/\nu(P)$ a peak A having a magnitude S which shows the absorption of a sample appears. In the figure, peak B is an interference peak appearing at the null path difference and the magnitude thereof is the integration of all the incident spectral peaks over all wave numbers which corresponds to the total energy of the incident light flux.

Figure 3B:
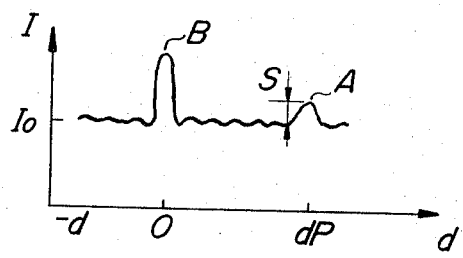

Next, when the second polarizer 4 is arranged to have its polarization direction parallel to that P1 of the first polarizer 2 and similar operations as above are done, an interference pattern of the polarization interference detected by the detector 7 is as shown in FIG. 3b. Namely, the locations of the peaks are the same as those of the case of FIG. 3a but the polarity is opposite to that of the case of FIG. 3a.

Figure 4:
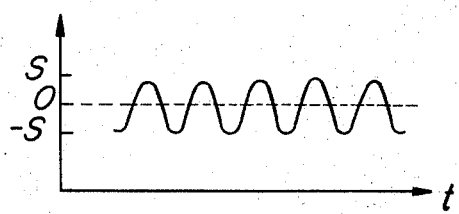
FIG. 4 is a modulated signal waveform obtained in the embodiment of the invention shown in FIG. 1.

Therefore, if the second polarizer 4 is rotated about the principal axis 1 as a function of time, a sinusoidally modulated electric signal as shown in FIG. 4 representing the absorption of the sample is derived from the detector 7. It is apparent that the rotation of the second polarizer 4 can be easily achieved by rotating the rotor 5 directly connected to the motor 7.

In FIG. 2, the abscissa represents wave number $\nu$ and the ordinate represents the absorption spectral intensity S. In FIG. 3, the abscissa represents the optical path difference $d$ and the ordinate represents the light intensity I.

In the above description, the second polarizer 4 is rotated, but instead the first polarizer may be rotated to obtain a similar result.

As is described above, modulation is simply done by rotating the first or the second polarizer in the system of FIG. 1, and thereby the modulation process is very simple. Further, this modulation is neither wave number or wavelength vibration type, nor optical path difference vibration type but so-called intensity modulation. Thus, even if the incident spectral peaks are closely adjoined to each other, the result of measurement does not become inaccurate unless they are perfectly superposed. Further, since the spectral peaks over all the wave numbers are utilized, there is no light loss. Yet further, since the intensity modulation is employed, it will be easily understood that the modulated signal has a magnitude at least two times as large as the conventional one.

Further, when it is necessary to know the position of null optical path difference in the system of FIG. 1, a bias plate 8 can be inserted. Since there are limits in the thickness of the Soleil compensator 3 achieved by sliding the two wedges and the optical path difference cannot be reduced to zero only by the compensator 3, the bias plate 8 is inserted with its optical axis orthogonally crossing the optical axis of the compensator 3 between the compensator 3 and the second polarizer 4 and the thickness of the compensator 3 is adjusted to become equal to the thickness of the bias plate 8. In this way, the optical path difference can be made zero. Further if the bias plate 8 is 90° rotated about the principal axis of the system so that it has the optical axis in the same direction as that of the Soleil compensator 3, the maximum optical path difference can be increased according to the necessity.

Further, the first and second polarizers 2 and 4 shown in the system of FIG. 1 are not limited to those of plate shape such as polymer polarizer film and wire grid polarizer but may be formed of any linear polarizer such as a multi-film polarizer, and various kinds of double refractive crystal polarizers.

Figure 5:
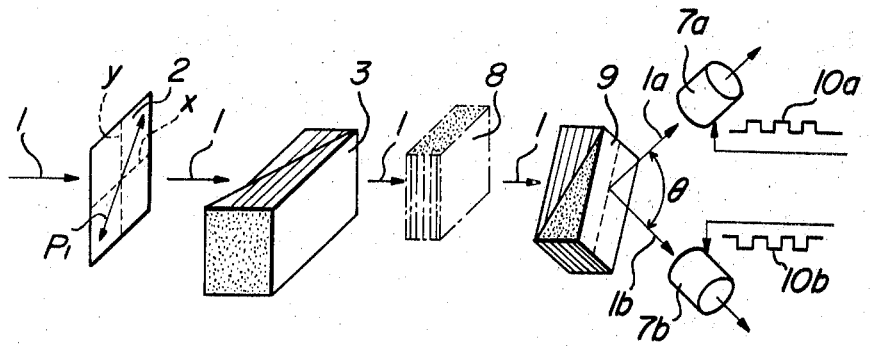
FIG. 5 is a perspective view of another embodiment of the invention.

FIG. 5 shows another embodiment of the present invention, in which numerals 1 to 3 and 8 represent similar parts as those of FIG. 1. Description will be mainly made on those points different from the system of FIG. 1. A Wollaston prism 9 is disposed on the principal axis and 45° angled from x axis of the first polarizer 2 to separately derive the x and y polarization components from the Soleil compensator 3 along two principal axes 1a and 1b which make an angle of θ. Detectors 7a and 7b receive the respective polarization components and are supplied with the respective gate signals 10a and 10b so as to alternately give the outputs.

The function of the embodiment of FIG. 5 constructed as above is as follows.

The x and y polarization components being orthogonal and having been subjected to an optical path difference by the Soleil compensator 3, as is described in reference to FIG. 1, are incident on the Wollaston prism 9. The optical axis of the crystal forming the incident surface of the Wollaston prism 9 is 45° angled from the optical axis of the Soleil compensator 3. Thus, respective interference beams are derived from the Wollaston prism along the principal axes 1a and 1b. Namely, the interference beam derived along the principal axis 1a is the vector sum of the projections of the x and y polarization components incident on the Wollaston prism 9 on the direction parallel to the optical axis of the crystal in said incident surface, and the interference beam derived along the principal axis 1b is the vector sum of the projection vectors of the x and y polarization components incident on the Wollaston prism 9 on the direction perpendicular to the optical axis of the crystal in said incident surface.

Thus, the two interference beams are equivalent to those obtained from the second polarizer 4 of the system of FIG. 1 in the cases when the polarization direction P2 of the second polarizer 4 is perpendicular to and is parallel to the polarization direction P1 of the first polarizer 2. Therefore, an electrical signal as shown in FIG. 6 is provided from the detectors 7a and 7b by supplying alternating gating signals 10a and 10b to the detectors 7a and 7b.

Figure 6:
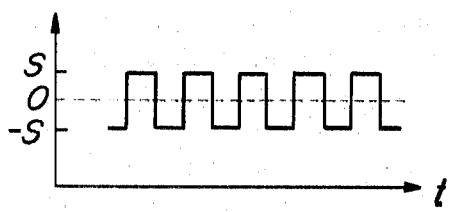
FIG. 6 shows a signal waveform obtained in said another embodiment of the invention.

In FIG. 6, the peak shape is square and the amplitudes are same. So it is apparent that similar effects as those in the case of FIG. 1 are provided by the system of FIG. 5.

In the system of FIG. 1, the first or the second polarizer should be mechanically rotated for achieving modulation, whereas in the system of FIG. 5 modulation is achieved electrically and thus there can be generated no mechanical vibration and noise and modulation frequency can be greatly increased. Further, if the signal frequency of the waveforms of FIG. 6 is the same with that of FIG. 4, it will be readily understood that the intensity of the signal of FIG. 6 is $\pi/2$ as large as that of FIG. 4.

When it is necessary to know the position of the null optical path difference in the system of FIG. 5, a bias plate 8 may be inserted between the Soleil compensator 3 and the Wollaston prism 9 with its optical axis arranged perpendicular to that of the Soleil compensator 3 similar to the case of FIG. 1 and the thickness of the Soleil compensator 3 is adjusted equal to that of the bias plate. Then, the optical path difference can be made zero according to necessity. Further, the maximum optical path difference can also be increased similar to the case of FIG. 1 by rotating the bias plate 8 by 90° about the principle axis 1 to align the optical axis of the bias plate in the same direction with that of the Soleil compensator 3.

Yet further, the first polarizer 2 shown in FIG. 5 is not limited to those of plate shape as is seen from the figure, e.g., polymer polarizer, and wire grid polarizer, but may be formed of any polarizer provided that it produces linear polarization, e.g., a multi-film polarizer, various kinds of double refractive crystal polarizers.

Alternations and modifications of the systems of FIGS. 1 and 5 are possible without parting from the spirit of the present invention. Therefore, the systems of FIGS. 1 and 5 should be understood only as embodiments for helping understanding of the invention and should not be read in any limitative way.

We claim:

1. A polarization interference correlation spectrometer comprising:
   first means for polarizing a light beam;
   second means for splitting the polarized beam obtained from said first means into two orthogonal polarization components and for generating a difference between the optical paths of the two orthogonal polarization components;
   third means for deriving two orthogonal polarization interference components from the two orthogonal polarization components obtained from said second means; and
   fourth means for deriving an electric modulated signal based on the two polarization interference components obtained from said third means.

2. A polarization interference correlation spectrometer according to claim 1, wherein said third means derives the two orthogonal polarization intrference components from the orthogonal polarization components obtained from said second means.

3. A polarization interference correlation spectrometer according to claim 1, wherein said third means alternately derives polarization interference components whose polarization axes are rectangular or parallel with the polarizing axis of the polarized beam obtained by said first means from the two orthogonal polarization components obtained by said second means on the same optical axis with that of the light beam.

4. A polarization interference correlation spectrometer according to claim 1, wherein said third means derives two polarization interference components of different polarities along respectively separate optical paths from the two orthogonal polarization components obtained from said second means.

5. A polarization interference correlation spectrometer according to claim 1, further comprising fifth means for enabling the optical path difference to become zero.

6. A polarization interference correlation spectrometer according to claim 4, further comprising fifth means for enabling the optical path difference to become zero.

7. A polarization interference correlation spectrometer according to claim 5, wherein said fifth means is rotatable about the optical axis of the light beam.

8. A polarization interference correlation spectrometer according to claim 1, wherein said second means is formed of a Soleil compensator.

9. A polarization interference correlation spectrometer according to claim 4, wherein said third means is formed of a Wollaston prism.

10. A polarization interference correlation spectrometer comprising:
first means for alternately producing two orthogonal polarization beams;
second means for splitting each of said two orthogonal polarization beams into two orthogonal polarization components and for generating a difference between the optical paths of said two orthogonal polarization components;
third means for deriving a polarization interference component from said two orthogonal polarization components obtained from said second means; and
fourth means for deriving an electric modulated signal based on the two orthogonal polarization interference components obtained from said third means.

11. A polarization interference correlation spectrometer according to claim 10, further comprising fifth means for enabling the optical path difference to become zero.

12. A polarization interference correlation spectrometer comprising:
a first polarizer for polarizing a light beam;
a Soleil compensator for splitting the polarized beam obtained from said firt polarizer into two orthogonal polarization components and for generating a difference between the optical paths of the two orthogonal polarization components;
a second polarizer rotatably provided for deriving two polarization interference components from the two orthogonal polarization components obtained from said Soleil compensator;
a bias plate selectively placed between said Soleil compensator and said second polarizer for nullifying said optical path difference; and
an electric signal modulation device for deriving an electric modulated signal based on the two polarization interference components obtained from said second polarizer.

13. A polarization interference correlation spectrometer comprising:
a first polarizer for polarizing a light beam;
a Soleil compensator for splitting the polarized beam obtained from said first polarizer into two orthogonal polarization components and for generating a difference between the optical paths of the two orthogonal polarization components obtained from said first polarizer;
a Wollaston prism for deriving two polarization interference components of different polarities along respectively separate optical paths from the orthogonal polarization components obtained from said Soleil compensator;
a bias plate selectively placed between said Soleil compensator and said Wallaston prism for nullifying said optical path difference; and
an electric signal modulation device for deriving an electric modulated signal based on the two polarization interference components obtained from said Wollaston prism.

14. A polarization interference correlation spectrometer comprising:
a first polarizer rotatably provided for alternately producing two orthogonal polarization beams;
a Soleil compensator for splitting each of said two orthogonal polarization beams into two orthogonal polarization components and for generating a difference between the optical paths of said two orthogonal polarization components;
a second polarizer for deriving a polarization interference component from said two orthogonal polarization components obtained from said Soleil compensator;
a bias plate selectively placed between the Soleil compensator and said second polarizer for nullifying said optical path difference; and
an electric signal modulation device for deriving an electric modulated signal based on two orthogonal polarization interference components obtained from said second polarizer.

15. A polarization interference correlation spectrometer comprising:
first means for polarizing a light beam;
second means for separating said polarized light beam into two orthogonal polarization components and for effecting a difference between the optical paths of said two orthogonal polarization components;
third means, disposed in the path of said two orthogonal polarization components for causing interference therebetween and for effecting modulation of the interference caused thereby; and
fourth means, coupled to said third means for generating an electrical signal representative of the modulated interference of the polarization components effected by said third means.

* * * * *